(12) United States Patent
Hayes et al.

(10) Patent No.: US 9,849,426 B2
(45) Date of Patent: Dec. 26, 2017

(54) ELECTROLYTE CHEMISTRY CONTROL IN ELECTRODIALYSIS PROCESSING

(71) Applicants: Thomas D. Hayes, Schaumburg, IL (US); Blaine F. Severin, Okemos, MI (US)

(72) Inventors: Thomas D. Hayes, Schaumburg, IL (US); Blaine F. Severin, Okemos, MI (US)

(73) Assignee: Gas Technology Institute, Des Plaines, IL (US)

( * ) Notice: Subject to any disclaimer, the term of this patent is extended or adjusted under 35 U.S.C. 154(b) by 47 days.

(21) Appl. No.: 14/616,262

(22) Filed: Feb. 6, 2015

(65) Prior Publication Data

US 2016/0228821 A1 Aug. 11, 2016

(51) Int. Cl.
| | |
|---|---|
| *B01D 61/44* | (2006.01) |
| *B01D 61/46* | (2006.01) |
| *B01D 61/54* | (2006.01) |
| *B01D 65/08* | (2006.01) |

(52) U.S. Cl.
CPC ............. *B01D 61/46* (2013.01); *B01D 61/44* (2013.01); *B01D 61/54* (2013.01); *B01D 65/08* (2013.01); *B01D 2313/32* (2013.01)

(58) Field of Classification Search
CPC ........ C02F 1/4693; B01D 61/44; B01D 61/46
See application file for complete search history.

(56) References Cited

U.S. PATENT DOCUMENTS

| | | | | |
|---|---|---|---|---|
| 5,324,403 A | * | 6/1994 | Kennedy ............... | B01D 61/44 204/525 |
| 2006/0060532 A1 | * | 3/2006 | Davis ................... | B01D 61/022 210/652 |

OTHER PUBLICATIONS

Kaakinen, J. et al., "High Recovery Desalting of Brackish Water by Electrodialysis: Field Tests at Yuma Desalting Test Facility & at La Verkin Springs", Report REC-ERC-84-24, Bureau of Land Reclam. Energy & Rsch Ctr, Denver, Colorado, Dec. 1984.

(Continued)

*Primary Examiner* — Steven A. Friday
(74) *Attorney, Agent, or Firm* — Pauley Erickson & Kottis

(57) ABSTRACT

Methods for controlling electrolyte chemistry in electrodialysis units having an anode and a cathode each in an electrolyte of a selected concentration and a membrane stack disposed therebetween. The membrane stack includes pairs of cationic selective and anionic membranes to segregate increasingly dilute salts streams from concentrated salts stream. Electrolyte chemistry control is via use of at least one of following techniques: a single calcium exclusionary cationic selective membrane at a cathode cell boundary, an exclusionary membrane configured as a hydraulically isolated scavenger cell, a multivalent scavenger co-electrolyte and combinations thereof.

14 Claims, 3 Drawing Sheets

(56) References Cited

OTHER PUBLICATIONS

Marshall, W. et al., "Aqueous Systems at High Temperature", Jnl of Chem. and Eng. Data, 1968, v. 13, pp. 83-93 (Abstract).
Xu, T. et al., "Electrodialysis-Based Technolgies, a Critical Review", AIChE Journal, Dec. 2008, v. 54, pp. 3147-3159.
Concurrently-filed U.S. Patent Application, Thomas D. Hayes et al., filed Feb. 6, 2015, "Electrolyte Chemistry and Improved Stack Performance in High Brine Concentration Electrodialysis".
Firdaous, L. et al., "Transfer of Monovalent and Divalent Cations in Salt Solutions by Electrodialysis," Separation Science and Tech., 2007, vol. 42, pp. 931-948.
Taky, M. et al., "Transport properties of a commerical cation-exchange membrane in contact with divalent cations or proton-divalent cation solutions during electrodialysis," Elsevier, Hydrometallurgy, 1996, vol. 43, pp. 63-78.

\* cited by examiner

ELECTROLYTE CHEMISTRY CONTROL IN ELECTRODIALYSIS PROCESSING

STATEMENT REGARDING FEDERALLY SPONSORED RESEARCH OR DEVELOPMENT

This invention was made with government support under grant DE-AC26-07NT42677 awarded by the Department of Energy (DOE). The government has certain rights in the invention.

BACKGROUND OF THE INVENTION

This invention relates generally to electrodialysis and, more particularly to electrolyte chemistry control in electrodialysis processing Electrodialysis is a membrane separation technology in which stacked pairs of selective cationic and anion selective membranes are typically used to segregate increasingly dilute salt streams from concentrated salt streams. Stacks of membrane pairs can be very large and can include 10 to 100 or more pairs of alternating membranes. At one end of the stack, electrochemical reactions are produced by a cathode in electrolyte solution. At the other end of the stack, another reaction is created by an anode in electrolyte solution. In the usual process, the electrolyte stream is separated from the dilute salt and the concentrated salt flows. The electrolyte solution is continuously applied to the electrodes.

Electrodialysis processing is conventionally driven by the hydrolysis of water, which is caused by applying a voltage across an electrode pair. The production of the gases oxygen and hydrogen are well known and thought to follow chemical reactions as in Equations A1 and C1 at the anode (A1) and at the cathode (C1).

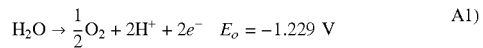
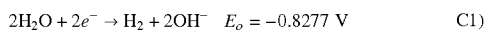

$$H_2O \rightarrow \frac{1}{2}O_2 + 2H^+ + 2e^- \quad E_o = -1.229 \text{ V} \quad \text{A1})$$

$$2H_2O + 2e^- \rightarrow H_2 + 2OH^- \quad E_o = -0.8277 \text{ V} \quad \text{C1})$$

FIG. 1 is a schematic of a conventional electrodialysis membrane stack arrangement, generally designated by the reference numeral 10. The electrodialysis membrane stack arrangement 10 includes an anode electrode cell 12, a cathode electrode cell 14 and a membrane stack (also sometimes simply referred to as a "stack") 16 appropriately disposed between the anode and the cathode cells.

The membrane stack 16 includes alternating cationic selective membranes 20 (and specifically identified by the references 20a, 20b, 20c . . . ) and anionic selective membranes 22 (and specifically identified by the references 22a, 22b, 22c . . . ), beginning and ending with cationic selective membranes 20a and 20f. By the nature of how the selective membranes are alternated, the flow of anions and cations are caused to become concentrated in one cell pair and diluted in an adjacent cell pair. As shown a manifold system is used to isolate the flow of concentrate (in a concentrate manifold 30) from the flow of diluate (in a diluate manifold 32).

The terminal cationic membranes 20a and 20f, located at either end of the cell stack, serve to isolate the cathode within a cathode cell and the anode within an anode cell, each cell being located on opposite sides of the stack (not shown). As shown in FIG. 1, the terminal cationic selective membranes 20a and 20f also isolate a respective flow area where a flow of electrolyte solution is supplied to the electrodes.

As shown in this representation, sodium ions or other cations, can pass through the cation selective membranes 20. However, the cations are rejected by the anion selective membranes 22. Likewise, chloride ions, or other anions can pass through the anion selective membrane 22, but are rejected by the cation selective membranes 20.

FIG. 1 also shows the dynamic balance between all the cells of the electrodialysis stack. Very importantly, sodium (Na+) plays a crucial balancing role in the proper operation of the electrodes. Because each electrode is isolated from in its corresponding electrolyte by a cationic selective membrane, this means that the ionic current is particularly dependent on sodium transport. However, if the cationic membrane allows calcium or magnesium transport, then these ions will pass into the electrolyte solution.

Electrodialysis has been conventionally used to treat light brine (e.g., brine that in general contains less than 1% salt and in some cases salt in a relative amount of as few as few hundred parts per million).

The application of electrodialysis processing to the treatment or processing of highly concentrated brines, especially those that contain a high concentration of soluble calcium, or other multivalent cations, can be particularly challenging.

For example, a practical problem in applying electrodialysis to the treatment of waters with calcium levels in the range of up to or about 100 mg/l is that a significant flux of calcium can occur through the cationic membrane from the stack cell adjacent to the cathode electrolyte cell to cause scale to form on the cathode and cause precipitates of calcium sulfate and other divalent sulfates to form in the electrolyte solution.

Furthermore, if soluble calcium or some other multivalent cation is transported into the electrolyte solution, then this cation can readily increase resistance to ion flow by fouling the electrode cell (specifically at the cathode) by forming precipitated calcium salts such as calcium hydroxide, or calcium sulfate. This greatly reduces the effective amperage and the rate of ion flux in the electrodialysis stack.

The prior art suggests that all cationic membranes within a stack be made of the same material. As such, if cationic membranes allow calcium flow, then soluble calcium will be transported across the cathode isolation membrane, and thus be integrated into the electrolyte solution. If calcium exclusionary membranes are utilized in all cells of the electrodialysis stack, then calcium cannot be collected in the concentrate and it will remain in diluate stream. This would be deleterious to the overall performance of the process.

Moreover, other divalent cations with similar chemistry to calcium, specifically barium, strontium, and radium, may be encountered in certain brines. An example of such a brine is flowback water from natural gas extraction from shale formations. In view thereof, it can be highly advantageous and sought to exclude these compounds, as well as calcium, from the electrolyte.

One widely used electrolyte solution is concentrated disodium sulfate. The aforementioned divalent cations, such as calcium, barium, and radium, are known to have very low solubility in the presence of sulfate. Thus it can be desirable to be able to use the standard disodium sulfate solution as the electrolyte without the danger of precipitating and concentrating unwanted cations in the electrolyte.

In view of the above, there is a need and a demand for improvements in electrodialysis processing. Further, there is need and a demand for improved control of electrolyte chemistry in such processing. Still further, there is a need and a demand for improvements in minimizing cation fouling, particularly, multivalent fouling in electrodialysis processing.

SUMMARY OF THE INVENTION

A general object of the invention is to provide improved electrodialysis and, more particularly, to minimization of cation fouling in electrodialysis processing.

A more specific objective of the invention is to overcome one or more of the problems described above or to otherwise appropriately address one or more of the above-identified and described needs and demands.

In accordance with one aspect of the invention, a method for controlling electrolyte chemistry such as in an electrodialysis unit that includes an anode and a cathode each in an electrolyte of a selected concentration and a membrane stack disposed therebetween. In such a unit, the membrane stack typically includes pairs of cationic selective and anionic membranes to segregate increasingly dilute salts streams from concentrated salts stream.

As detailed below, in accordance with one embodiment, a desirable method for controlling electrolyte chemistry involves application of at least one technique selected from the group consisting of using a single calcium exclusionary cationic selective membrane at a cathode cell boundary, using an exclusionary membrane configured as a hydraulically isolated scavenger cell, using a multivalent scavenger co-electrolyte and combinations thereof.

Another aspect of the invention relates to specific improvements in electrodialysis units that include an anode and a cathode each in an electrolyte of a selected concentration and a membrane stack disposed therebetween, the membrane stack comprising pairs of cationic selective and anionic membranes to segregate increasingly dilute salts streams from concentrated salts stream. As detailed below, in one embodiment such improvement involves placement of a single calcium exclusionary cationic selective membrane at a cathode cell boundary to minimize transport of multivalent cations into the cathode cell.

In another improvement embodiment, relates to placing or disposing an exclusionary membrane configured as a hydraulically isolated scavenger cell in the membrane stack.

As used herein, references to electrodialysis in "high brine conditions" are to be understood to generally refer electrodialysis processing at total dissolved solids (TDS) levels of at least about 0.5% TDS, and in some cases more or greater than 1% TDS, and typically up to about 8% TDS.

Other objects and advantages will be apparent to those skilled in the art from the following detailed description taken in conjunction with the appended claims and drawings.

DETAILED DESCRIPTION OF THE INVENTION

Figure 2:
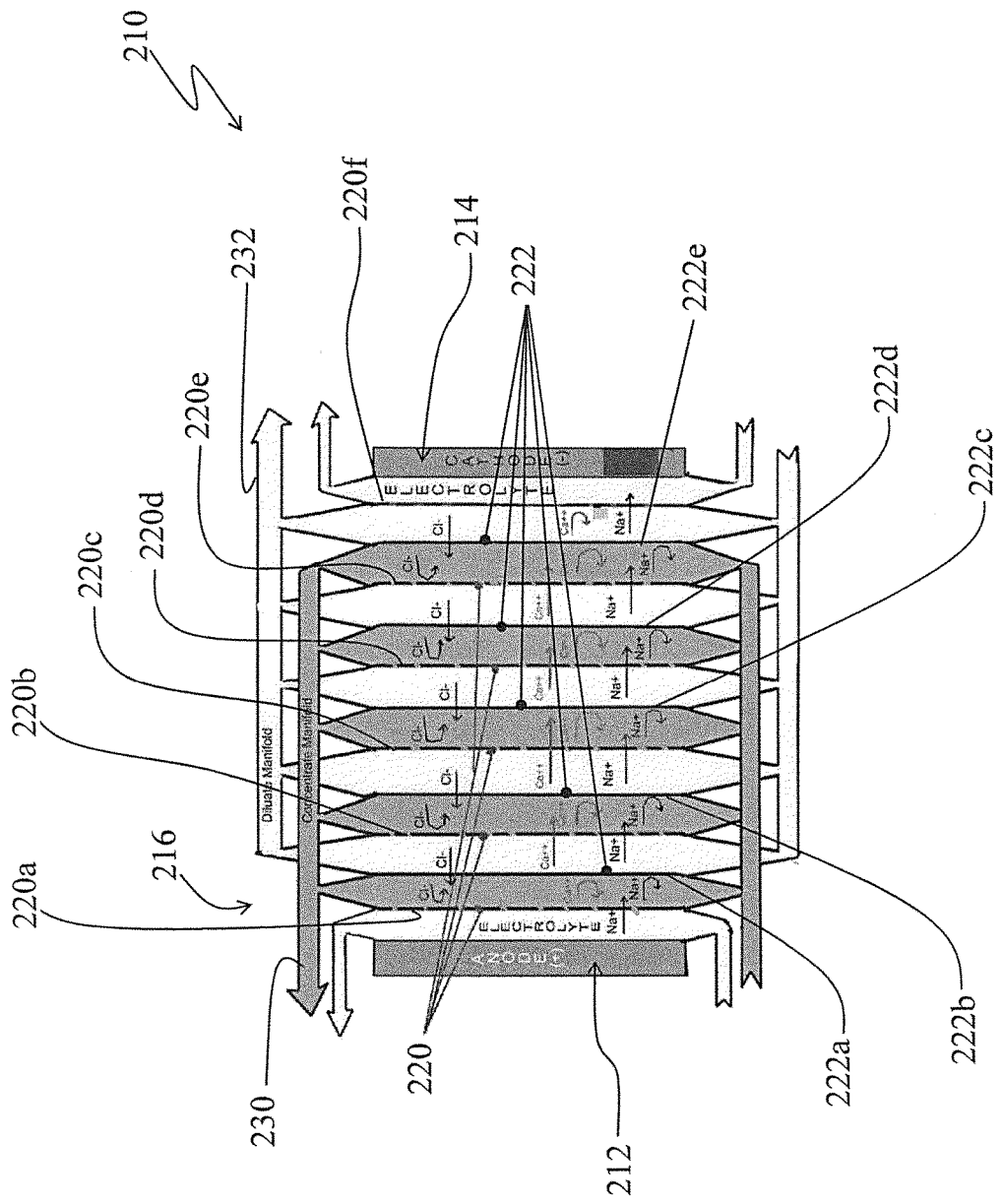
FIG. 2 is a simplified schematic of an electrodialysis membrane stack arrangement as modified in accordance with one aspect of the invention.

The present invention provides improved electrodialysis and, more particularly, to improved electrolyte chemistry control in electrodialysis processing Turning to FIG. 2, there is shown a simplified schematic of an electrodialysis membrane stack arrangement, generally by the reference 210, in accordance with one aspect of the invention.

Figure 1:
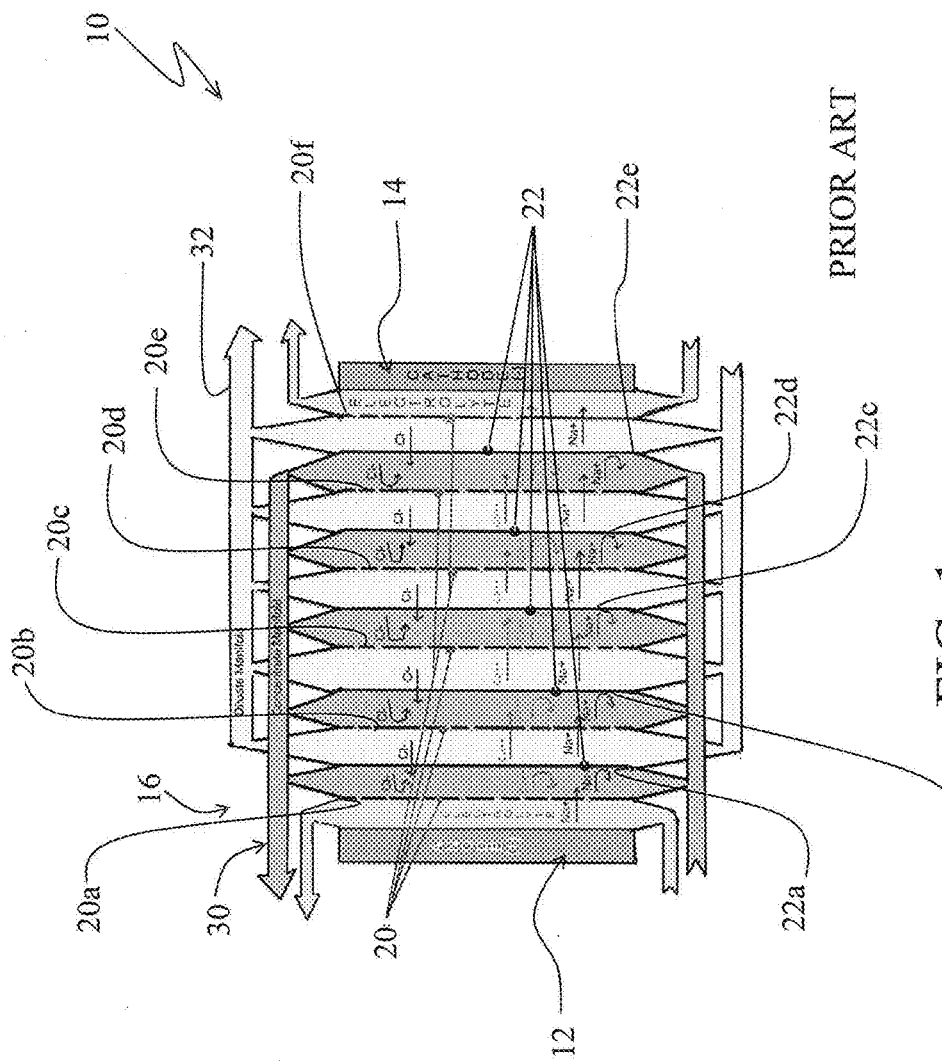
FIG. 1 is a simplified schematic of a conventional electrodialysis membrane stack arrangement.

The electrodialysis membrane stack arrangement 210 is somewhat similar to the electrodialysis membrane stack arrangement 10 shown in FIG. 1 and discussed above. For example, the electrodialysis membrane stack arrangement 210 similar to the electrodialysis membrane stack arrangement 10 includes an anode electrode cell 212, a cathode electrode cell 214 and a membrane stack 216 appropriately disposed between the anode and the cathode cells. Also, the membrane stack 216 includes alternating cationic selective membranes 220 (and specifically identified by the references 220a, 220b, 220c . . . ) and anionic selective membranes 222 (and specifically identified by the references 222a, 222b, 222c . . . ), beginning with the cationic selective membrane 220a. Further, by the nature of how the selective membranes are alternated, the flow of anions and cations are caused to become concentrated in one cell pair and diluted in an adjacent cell pair. As shown a manifold system is used to isolate the flow of concentrate (in a concentrate manifold 230) from the flow of diluate (in a diluate manifold 232).

The electrodialysis membrane stack arrangement 210, however, primarily differs from the electrodialysis membrane stack arrangement 10 by the placement or positioning of a single calcium exclusionary cationic selective membrane 220f as the cathode cell boundary. All other cationic selective membranes within the electrodialysis membrane stack are non-exclusionary cationic membranes.

More particularly, and especially in processing of streams or waters containing high concentrations of soluble calcium, it has been found that the cationic selective membrane at the cathode is beneficially a special membrane material that allows for the transport of monovalent cations, such as sodium, but limits the transport of divalent cations such as calcium or magnesium or other multivalent metals that form precipitates with the anions present in the electrolyte solution. Furthermore, the selective membrane at the anode desirably should allow transport of all cationic species.

Those skilled in the art and guided by the teachings herein provided will understand and appreciate that practice of the invention can desirably prevent, avoid, minimize or overcome at least some of the above-discussed problems associated with transport of soluble calcium into the electrolyte solution.

For example, practice of the invention can desirably prevent, avoid, minimize or overcome problems associated with transport of soluble calcium into the electrolyte solution such as leading to increased resistance to ion flow by fouling the electrode cell (specifically at the cathode) such as by the formation of precipitated calcium salts such as calcium hydroxide or calcium sulfate and the resulting reduction in the effective amperage of the electrodialysis stack at a specific voltage.

Moreover, compounds containing other divalent cations with similar chemistry to calcium, including specifically, for example, barium, strontium, thorium and radium, can be excluded, as well as calcium, from the electrolyte.

Furthermore, the invention permits the more widespread usage of disodium sulfate solution as an electrolyte with reduced danger of precipitating and concentrating unwanted cations in the electrolyte.

In accordance with one embodiment, a single Tokyama CMX-S, exclusionary membrane (which is a composite material comprised of a polymerized aniline layer on a poly(styrene sulfonic acid) membrane base) rejected about 80% of the flux of calcium into the electrolyte and has been found to be a suitable single calcium exclusionary cationic selective membrane for use in the practice of the invention. More specifically, practice of electrodialysis with the use of such a single calcium exclusionary cationic selective membrane as the cathode cell boundary manages to permit calcium to migrate into the electrolyte but avoids electrolyte, membrane and/or cell fouling.

It is believed that the likely mechanism by which such inclusion and placement of such a single, exclusionary membrane operates is that the exclusionary membrane reduces the rate of fouling by rejecting calcium from the posterior surface inside the catholyte cell. However, we have further found that there is a surprising duality to the action of the single exclusionary membrane. On the anterior side (toward the diluate cell), the membrane minimizes the flux of calcium passing the membrane. On the posterior side (inside the catholyte cell), any passed calcium enters the electrolyte without immediately fouling the membrane.

Thus, this aspect of the invention provides a novel means of limiting the degradation of electrolyte solutions and limiting resistance to ion flow in electrodialysis processing by selectively minimizing transport of calcium, magnesium or other multivalent cations into the cathode cell by use of a single calcium exclusionary cationic selective membrane at the cathode cell boundary.

Further, the invention allows the use of standard electrolyte solution disodium sulfate, even in the presence of undesirable cations such as calcium, barium, or radium, which are known to precipitate as the sulfate salt.

Still further, the invention allows the use of electrolytes that are at elevated pH, such as pH 11-12.5, without the associated problems of precipitation of hydroxide salts.

In accordance with another aspect of the invention, a novel method and hydraulic system is introduced for electrodialysis processing. As detailed below, the new method and system desirably reduce, minimize and preferably avoids or eliminates the potential for multivalent cation transport into the electrolyte at the cathode. A multivalent scavenger cell is created by two cation selective multivalent exclusionary membranes and an anion selective membrane. In one preferred configuration, a scavenger cell is constructed with one multivalent cation exclusionary membrane immediately adjacent to the cathode. The proximal membrane is the anion selective membrane. The final multivalent cation exclusionary membrane is proximal to the aforementioned anion selective membrane. The hydraulics of the scavenger cell are isolated from the other flows in the electrodialysis stack, i.e., the electrolyte, the diluate, and the concentrate. In such configuration, cations such as calcium must pass an exclusionary membrane, a cleansed solution tailored for multivalent cation capture, and a second exclusionary membrane in order to be transported into the electrolyte in the cathode cell. The fluid applied to the scavenger cell is a co-electrolyte chemically tailored for capture of the multivalent cations. If desired, an external filter or ion exchange bed can used to continually cleanse the co-electrolyte of the multivalent cations.

Figure 3:
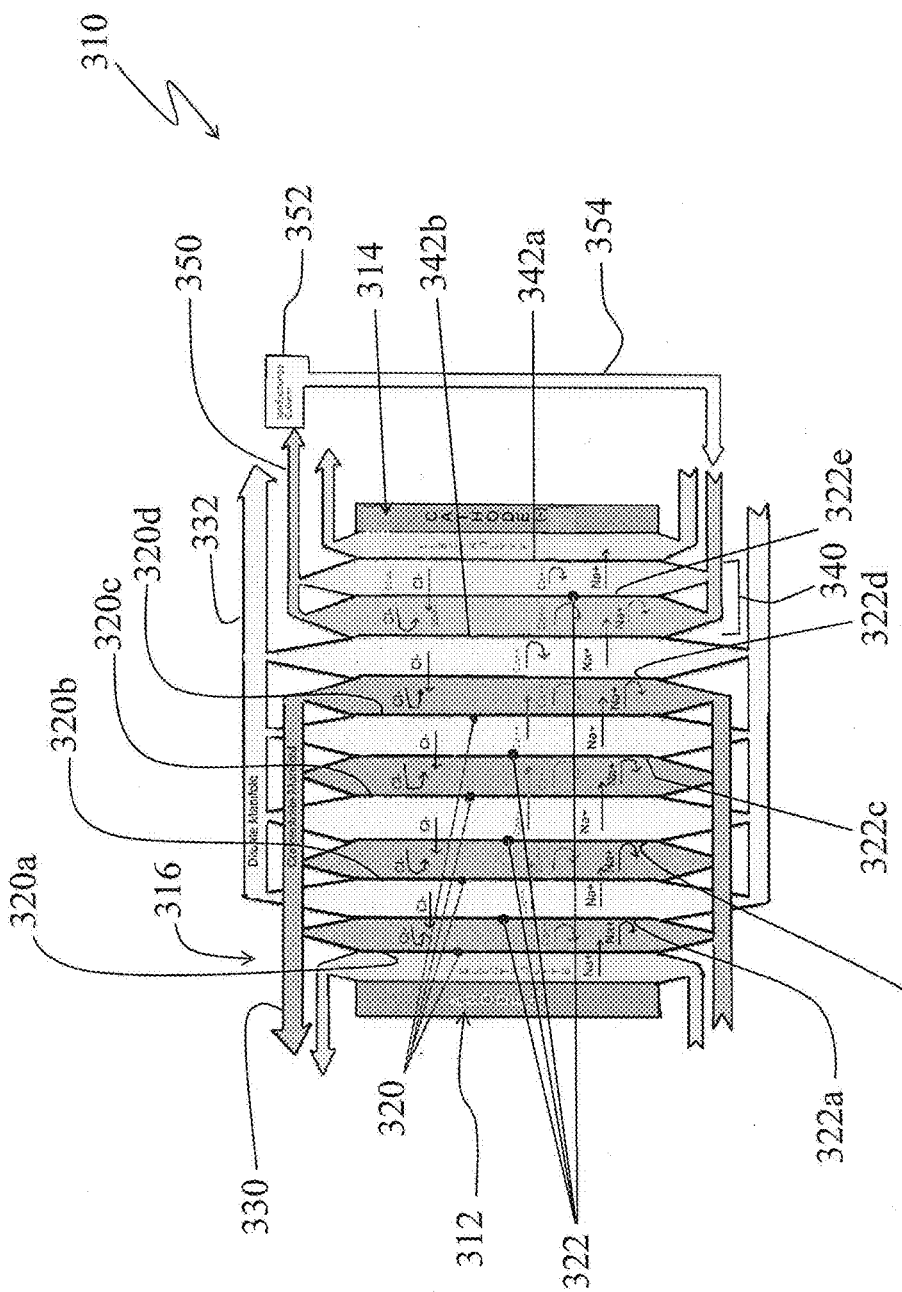
FIG. 3 is a simplified schematic of an electrodialysis membrane stack arrangement as modified in accordance with another aspect of the invention.

Turning to FIG. 3, there is shown a simplified schematic of an electrodialysis membrane stack arrangement, generally by the reference 310, in accordance with one embodiment of this aspect of the invention.

The electrodialysis membrane stack arrangement 310 is somewhat similar to the electrodialysis membrane stack arrangement 10 shown in FIG. 1 and discussed above. For example, the electrodialysis membrane stack arrangement 310 similar to the electrodialysis membrane stack arrangement 10 includes an anode electrode cell 312, a cathode electrode cell 314 and a membrane stack 316 composed of alternating cationic selective membranes 320 (and specifically identified by the references 320a, 320b, 320c, . . . ) and anionic selective membranes 322 (and specifically identified by the references 322a, 322b, 322c, . . . ) appropriately disposed between the anode and the cathode cells. A manifold system is used to isolate the flow of concentrate (in a concentrate manifold 330) from the flow of diluate (in a diluate manifold 332).

The electrodialysis membrane stack arrangement 310, however, differs from the electrodialysis membrane stack arrangement 10 via the creation and placement of a scavenger cell 340 adjacent the cathode electrode cell 314. In accordance with one preferred embodiment, the scavenger cell 340 is generally composed of an electrochemical cell formed by replacing two generic cation selective membranes with two multivalent cation exclusionary membranes 342a and 342b. A first of the multivalent cation exclusionary membrane replacements is the membrane 342a immediately adjacent to the cathode 314. The anion selective membrane 322e immediately proximal to the membrane 342a remains. A second of the multivalent cation exclusionary membrane replacements is the proximal membrane 342b. This forms an electrochemical cell pair that allows cation flow toward the cathode and anion flow toward the anode.

The scavenger cell 340 is desirably hydraulically isolated from both the water flow cells (concentrate and diluate) and the electrolyte flow, as shown with a scavenger cell flow path 350.

Further, the fluid in the scavenger cell can desirably be chemically tailored for the collection of the unwanted cations. For example, in one embodiment, sulfate or phosphate ions may be used to precipitate the multivalent cations. If desired, an external filter can be used to capture the precipitate. For example, in an alternative embodiment, chloride, nitrate, or other anion that is not readily precipitated can be used to keep undesired multivalent cation(s) in solution. A chelating agent such sodium EDTA could be used to further discourage precipitation. The offending cations can, if desired and as shown, be captured or removed via an external filter and/or an ion exchange bed 352, with fluid return via line 354. In practice, the total flow and total volume of the scavenger can be minimal compared to the electrolyte volume and treated water volume.

Those skilled in the art and guided by the teachings herein provided will further understand and appreciate that if desired, the scavenger cell concept, as modified, can be applied anywhere within the electrodialysis stack. That is, the scavenger cell concept described herein can be applied anywhere within the electrodialysis stack where it may be advantageous to cleanse the diluate of offending cations. In such applications, the cation exchange membrane toward the cathode would be a multivalent cation exclusionary membrane and the second cation selective membrane toward the anode would allow passage of all cations. The scavenger cells could be alternated with the normal cell pairs (concentrate and diluate) and could occupy as many as 50% if the total cell pair positions. The resultant electrodialysis stack would have the effect of scavenging a majority of the multivalent cations from the diluate flow.

Thus, the invention provides improved electrodialysis and, more particularly, improved electrolyte chemistry control in electrodialysis processing It is to be understood that the discussion of theory, such as the discussion relating to how or why the inclusion and placement a single calcium exclusionary cationic selective membrane at a cathode cell boundary beneficially prevents, avoids or minimizes electrolyte, membrane and/or cell fouling, for example, is included to assist in the understanding of the subject invention and is in no way limiting to the invention in its broad application.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for controlling electrolyte chemistry in operation of an electrodialysis unit comprising an anode and a cathode, the anode and the cathode both having an electrolyte solution of a selected concentration continuously applied to both the anode and the cathode and with a membrane stack comprising a plurality of cells in series relative to ion flow disposed between the anode and the cathode, the membrane stack comprising pairs of cationic selective and anionic selective membranes to segregate increasingly dilute salts streams from concentrated salts stream by acting upon a salt solution that is distinct and separate from the electrolyte solution, the method comprising including only one multivalent cation selective exclusionary membrane within the electrodialysis unit and disposing the one multivalent cation selective exclusionary membrane at a cathode cell boundary to limit transport of cationic species to the cathode cell.

2. The method of claim 1 wherein a) the electrolyte solution comprises disodium sulfate and b) the salt solution comprises cations comprising at least one of calcium, barium, strontium, thorium and radium.

3. The method of claim 1 wherein the electrolyte solution comprises an elevated pH in a range of 11-12.5 without occurrence of hydroxide salt precipitation.

4. The method of claim 1 wherein the one multivalent cation selective exclusionary membrane is disposed solely at the cathode cell boundary.

5. The method of claim 1 wherein the membrane stack comprises at least three pairs of cationic selective and anionic selective membranes.

6. The method of claim 5 wherein the membrane stack comprises at least 10 pairs of cationic selective and anionic selective membranes.

7. The method of claim 1 wherein each cell comprises a pairing of a cationic selective membrane and an anionic selective membrane and wherein the flow of anions and cations are caused to become concentrated in one cell pair and diluted in an adjacent cell pair, the method further comprising:

isolating, from alternate cell pairings, a flow of salt concentrate from a flow of diluate via a concentrate manifold and a diluate manifold, respectively.

8. In an electrodialysis unit comprising an anode and a cathode, the anode and the cathode both having an electrolyte solution of a selected concentration continuously applied to both the anode and the cathode and with a membrane stack comprising a plurality of cells in series relative to ion flow disposed between the anode and the cathode, the membrane stack comprising at least three pairs of cationic selective and anionic selective membranes to segregate increasingly dilute salts streams from concentrated salts stream by acting upon a salt solution that is distinct and separate from the electrolyte solution, the improvement comprising:

the electrodialysis unit containing only one multivalent cation selective exclusionary membrane, with said multivalent cation selective exclusionary membrane disposed solely at a cathode cell boundary to minimize transport of multivalent cations into the cathode cell.

9. The improvement of claim 8 wherein said multivalent cation selective exclusionary membrane minimizes transport of multivalent cations comprising calcium, barium or magnesium.

10. The improvement of claim 8 wherein a) the electrolyte solution comprises disodium sulfate and b) the salt solution comprises cations comprising at least one of calcium, barium, radium and combinations thereof in high brine conditions.

11. The improvement of claim 8 wherein the electrolyte solution comprises an elevated pH in a range of 11-12.5 without occurrence of hydroxide salt precipitation.

12. The improvement of claim 8 wherein the membrane stack comprises at least 10 pairs of cationic selective and anionic selective membranes.

13. The improvement of claim 8 wherein each cell comprises a pairing of a cationic selective membrane and an anionic selective membrane and wherein the flow of anions and cations are caused to become concentrated in one cell pair and diluted in an adjacent cell pair, the method further comprising:

isolating, from alternate cell pairings, a flow of salt concentrate from a flow of diluate via a concentrate manifold and a diluate manifold, respectively.

14. A method for controlling electrolyte chemistry in an electrodialysis unit, the electrodialysis unit comprising an anode and a cathode, with an electrolyte solution of a selected concentration continuously applied to both the anode and the cathode, and wherein a membrane stack comprising a plurality of cells in series relative to ion flow is disposed between the anode and the cathode to segregate increasingly dilute salts streams from concentrated salts stream by acting upon a salt solution that is distinct and separate from the electrolyte solution, the method comprising:

the electrodialysis unit containing only one multivalent cation selective exclusionary membrane, said multivalent cation selective exclusionary membrane disposed at a cathode cell boundary and wherein each cell comprises a pairing of a cationic selective membrane and an anionic selective membrane and wherein the flow of anions and cations are caused to become concentrated in one cell pair and diluted in an adjacent cell pair, the method further comprising:

isolating, from alternate cell pairings, a flow of salt concentrate from a flow of diluate via a concentrate manifold and a diluate manifold, respectively.

* * * * *